3,477,586
PORTABLE GUN RACK
Lawrence Haluska, 10646 Holman Ave.,
Los Angeles, Calif. 90024
Filed Aug. 28, 1967, Ser. No. 663,619
Int. Cl. A47f 7/00
U.S. Cl. 211—64                                           1 Claim

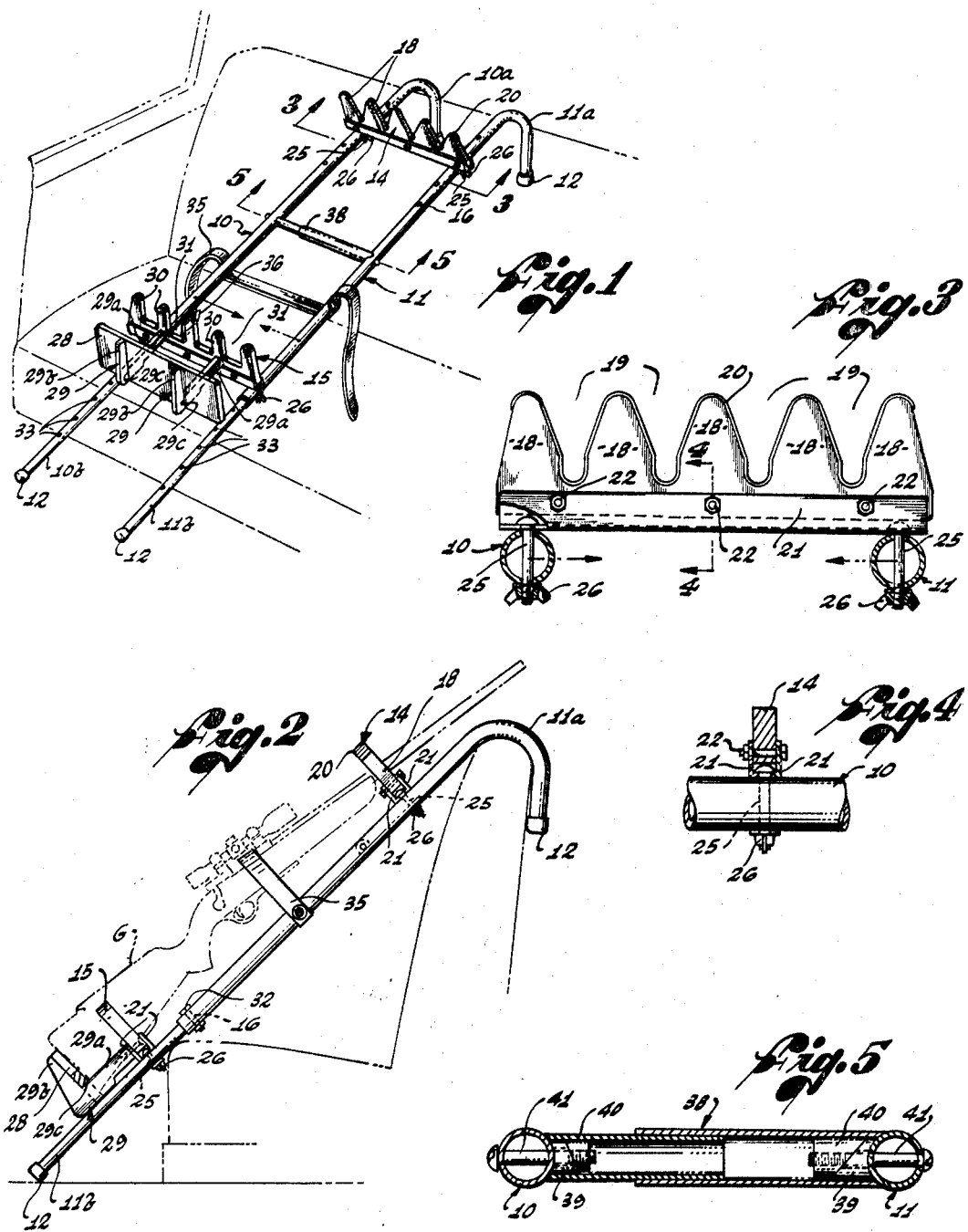

ABSTRACT OF THE DISCLOSURE

A portable gun rack holds a plurality of guns for safe transport, particularly when carried in an automobile or other vehicle. The rack is adjustable in width and length to adapt it to a wide variety of conditions and gun sizes. The rack may also be carried manually or used as a storage rack.

BACKGROUND OF THE INVENTION

The present invention relates generally to gun racks, and more especially to a portable rack designed to hold a plurality of rifles, shotguns, or similar objects for transportation in a vehicle.

When traveling to and from the scene of hunting or sport-shooting, rifles and shotguns are carried in cars. If not properly loaded in the vehicles and firmly held in place, there is always the danger that the guns may be damaged in some way by being thrown against parts of the automobile as the result of motion or vibration during travel. There is also the possibility of injury to the occupants from guns that are not adequately secured within the vehicle. These conditions indicate the need of a rack or other means which can be mounted in the vehicle for transportation thereby and which is in turn adapted to receive and hold a plurality of guns, for example rifles or shotguns, to hold the guns firmly and safely during transportation.

Thus, it becomes a general object of the present invention to provide a gun rack which is especially designed to be mounted in a vehicle and to hold a plurality of guns in the rack for safe transportation by the vehicle.

It is also an object of the present invention to provide a gun rack which is adjustable in size to accommodate the rack to the wide variety of conditions encountered in various automotive vehicles, while at the same time supporting the guns with maximum safety and security to the guns themselves.

It is also an object of the present invention to provide a gun rack of the above character which is versatile in its use and can be employed as a storage rack when not in the vehicle, in order to increase the utility of the rack, as well as any scopes mounted thereon.

SUMMARY OF THE INVENTION

These objects are achieved in a gun rack constructed according to the present invention that comprises a pair of laterally spaced, longitudinally extending rails, and a pair of cross bars which are spaced apart longitudinally of the rails, with manually releasable means being provided for interconnecting the rails and the cross bars at the points of mutual intersection. Such means when released permits movement of the rails toward and away from each other and relative to the cross bars in order to vary the spacing between the rails. The rails are preferably tubular, telescoping members rendering the rails adjustable in length.

Means are provided for locking the telescoping members together in adjusted positions, such means in the preferred embodiment of the invention being incorporated in the manually releasable means interconnecting the rails and the cross bars.

DESCRIPTION OF THE DRAWING

How the above objects and advantages of the invention, as well as others not specifically mentioned herein are attained, will be more readily apparent by reference to the following description, and to the annexed drawing, in which:

FIGURE 1 is a perspective view of a gun rack embodying the present invention, with a portion of an automobile seat illustrated to show the manner of supporting the gun rack thereon;

FIGURE 2 is a side elevation of the gun rack resting on an automobile seat, with a rifle supported in the rack, and with a fragment broken away;

FIGURE 3 is a combined elevation and transverse section on line 3—3 of FIGURE 1;

FIGURE 4 is a fragmentary section on line 4—4 of FIGURE 3; and

FIGURE 5 is a transverse section on line 5—5 of FIGURE 1.

DESCRIPTION OF THE PREFERRED EMBODIMENT

Referring now to the drawing, and more especially to FIGURE 1, it will be seen that the portable gun rack illustrated therein comprises a pair of longitudinally extending rails 10 and 11. At one end, normally considered to be the upper end of the rack, each of the rails is bent to provide a hook 10a and 11a, respectively.

Rails 10 and 11 are preferably tubular members made from some lightweight metal, for example aluminum; but, of course, other materials having adequate strength may be used. An advantage of the tubular construction is that each rail may be composed of a pair of telescoping members, the inner members of the rails being illustrated at 10b and 11b, respectively. The small diameter sections are locked to the large diameter sections by means, later described. The advantage of this arrangement is that the overall length of the two side rails can be adjusted as desired so that when the hooked ends engage the upper edge of the seat back as shown in FIGURE 2, the lower ends of the rails rest on the floor. To improve the looks and also to protect the car or other objects, the ends of the rails may be provided with protective caps 12.

The gun rack also includes an upper cross bar or board 14 and a lower cross bar or board 15 secured to the two side rails. These may both be composed of plywood or a suitable plastic. For purposes of attachment of the cross bars it will be noticed that each of rails 10 and 11 is provided at a suitable location with an opening 16 to permit interconnection between the cross bars and rails.

The upper cross bar is shown in greater detail in FIGURES 3 and 4, from which it will be seen that the cross bar comprises a member of wood or other suitable material providing a plurality of fingers 18 between which are recesses 19, each of which is adapted to receive the barrel of a rifle or shotgun. To protect the finish of the gun, the edges of the cross bar coming in contact with the gun barrel may be covered with a protective layer 20 of felt, or other suitable soft material.

Upon its lower edge, there is attached to the cross bar 14 a pair of angles 21, one being mounted on each of two opposite faces of the cross bar and held in place by a plurality of bolts 22 passing through the cross bar. At their outer ends, the opposed flanges of the two angles 21 are turned inwardly toward each other but are spaced apart and are also spaced from the edge of the cross bar. This arrangement, as shown in FIGURE 4, provides an open guide channel extending longitudinally of the cross bar and adapted to receive the heads of the two bolts 25. Bolts 25 extend through openings 16 in the side rails and are provided at one end with wing nuts 26 by which the bolts may be tightened manually in order to frictionally lock the cross bar and the side rails together in any adjusted position. An arrangement as in FIGURE 4 attaches the lower cross bar 15 to the rails.

The channels and bolts form means for interconnecting the side rails and bars; and when the bolts are loosened, by backing off wing nuts 26, the bolt heads slide lengthwise of the cross bars in the guide channel formed by the two angles 21 so that the side rails can be moved toward and away from each other in order to adjust the width of the gun rack.

The second cross bar 15 is spaced from cross bar 14 longitudinally of rails 10 and 11. It is provided with a pair of angles 21 at one edge forming a similar channel means adapted to receive the ends of bolts 25 passing through openings 16 of the side rails. These bolts, in the same manner as already described, when loosened, allow the rails to be moved toward and away from each other to adjust their spacing, such movement being permitted because of the slideable engagement between the bolt heads and angles 21. When wing nuts 26 are tightened, then the cross bar and the two side rails are held frictionally locked in any adjusted position.

The lower cross bar 15 differs from the upper one in that it has attached to it a shelf-like abutment member or board 28 against which the butts of the guns rest. This shelf or board 28 is preferably spaced below cross bar 15 and is supported therefrom, and therefore from the lower tubes 10b and 11b by a pair of depending brackets 29. Each of these brackets is generally L-shaped, comprising a leg 29a abutting and adhesively joined to the lower side of the cross bar 15, and extending through a notch 29c in the lower edge of shelf 28, and an upright leg 29b backing up and adhesively joined to the back of the shaft 28.

Since the lower cross bar is adapted to receive the butts of the guns, it will be noticed that the fingers 30, which define between them recesses 31, are relatively narrower while the recesses are relatively wider, than is the case with the upper cross bar. The size and number of the recesses in any of the cross bars can of course be varied as desired and according to the type of guns, or other equipment, which it is desired to stow in the rack. While the rack is intended primarily as a gun rack and guns are spoken of as being held therein, it will, at the same time, be realized that the rack is adaptable to holding other elongated objects, such as fishing poles, and accordingly the cross bars may be custom-tailored to accommodate other or specific articles.

As mentioned earlier, each of the rails 10 and 11 preferably comprises a pair of telescoping members. These may be locked together by passing a bolt 32 through registering openings in the members as in FIGURE 2, the inner members 10b and 11b being provided with a plurality of spaced openings 33 which may be brought into registration with lower openings 16 in rails 10 and 11. While it is within the scope of the invention to provide separate bolts 32 for this purpose, it is convenient to utilize bolts 25 on the lower cross bar 15 for this purpose so that the same bolts not only hold the two telescoping members in adjusted positions but also hold the cross bars and rails in adjusted position, as shown in FIGURE 1.

A gun G is placed in the recesses of the two cross bars, in the manner shown in FIGURE 2, with the gun butt resting against shelf 28. To hold the gun or guns securely in place, a strap 35 is provided with a buckle 36. Strap 35 is here shown as passing around the two side rails and also any gun or guns held within the recesses of the two cross bars. The strap is then tightened and held in place by buckle 36. Although a loose strap 35 is satisfactory for this purpose and readily accommodates itself to changes in the spacing between the two rails, it is also possible to fasten the ends of the strap to the two rails, thereby allowing the rails to be moved toward and away from each other without interference or limitation by the presence of the strap.

It is an advantage and a feature of the invention to add cross brace 38, shown particularly in FIGURE 5. This is a telescoping member in two sliding sections, the ends of which are attached to rails 10 and 11. While any suitable means of attachment may be employed, it has been found satisfactory to provide a pair of tapered wedges 39 and 40, the inner wedge member being provided with a threaded central bore adapted to receive a threaded bolt 41. When the bolt is tightened, the two wedges 39 and 40, since they engage on faces that are inclined to the axis of the bolt, slide laterally with respect to each other to, in effect, expand and tightly grip the interior of the tubular brace. Brace 38 gives a desirable degree of rigidity to the gun rack while still allowing full range of lateral movement of the rails.

When in use in a vehicle, the rack is particularly adapted to be mounted upon a vehicle seat, as shown in FIGURE 2, with the upper hooked ends of the rails resting over the seat back. The lower end of the rack may rest against the front edge of the seat or against the floor of the vehicle as desired. Generally, the side rails should be as far apart as possible in order to give lateral stability to the rack; but the rails may be moved together when necessary in order to accommodate them to relatively narrow seats, such as bucket seats currently found in many automobiles.

The rack is easily removed from the vehicle by merely lifting it up clear of the seat and then moving it out of the door of the vehicle. In this condition, it is adapted to be carried manually with the guns mounted in it. The rack is adapted for use as a storage unit in a cabin or home by merely hanging the rack up, either over a rod or other suitable member, or by hanging the rack with the tips 12 resting on a ledge, shelf, or other horizontal surface.

From the foregoing description, it will be apparent that many changes may be made in the specific shape, size, and detailed arrangement of the parts constituting the improved portable gun rack, without departing from the spirit and scope of the present invention. Accordingly, it is to be understood that the foregoing description is to be considered illustrative of, rather than limitative upon, the invention as defined by the appended claim.

I claim:

1. A portable gun rack adapted for carrying in an automobile having a seat, seat cushions, and floor, comprising:

a pair of parallel rails, each consisting of a pair of upper and lower telescoping tubes adapted for being clamped together in selected positions of over-all length, the upper tubes of said rails being formed with rearwardly projecting hooks adapted for grasping the upper edge of an automobile seat, the rails being formed and arranged to project down across the seat cushion and to the vehicle floor;

an upper transverse cross-board connecting said upper tubes just below said hooks, said cross-board projecting forwardly from said tubes, oppositely from said hooks, and said cross-board having a plurality of recesses formed therein to receive the barrels of guns and support them forwardly of the plane of said tubes;

a lower transverse cross-board connecting said lower tubes and adjustable longitudinally of the rails, toward or away from said hooks, by telescopic adjustment of the upper and lower tubes making up said rails, said lower cross-board projecting forwardly from said tubes, and having a plurality of recesses therein aligned with the recesses in the upper cross-board adapted to receive the stocks of guns whose barrels are seated in the recesses of the upper cross-board; and a gun-butt-support board spaced in back of said lower cross-board and supported from said lower tubes.

References Cited

UNITED STATES PATENTS

| | | | |
|---|---|---|---|
| 1,060,914 | 5/1913 | Willow | 182—179 X |
| 1,478,032 | 12/1923 | Hine | 211—68 |
| 2,158,623 | 6/1939 | Fischbacher | 211—64 X |
| 2,371,156 | 3/1945 | Dahlander | 182—228 X |
| 2,797,033 | 6/1957 | Rasbash | 211—64 X |
| 2,958,422 | 11/1960 | Caloiero | 211—64 X |
| 3,167,182 | 1/1965 | Calvin | 211—64 |
| 3,294,247 | 12/1966 | Norrington | 211—64 |

CHANCELLOR E. HARRIS, Primary Examiner

U.S. Cl. X.R.

297—188